United States Patent
Kanetake et al.

(10) Patent No.: US 11,893,752 B2
(45) Date of Patent: Feb. 6, 2024

(54) MOVING BODY SPEED DERIVATION METHOD AND MOVING BODY SPEED DERIVATION PROGRAM

(71) Applicant: FUJITSU LIMITED, Kawasaki (JP)

(72) Inventors: Jun Kanetake, Kawasaki (JP); Rie Hasada, Tama (JP); Haruyuki Ishida, Kawasaki (JP); Yasuto Watanabe, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 17/347,213

(22) Filed: Jun. 14, 2021

(65) Prior Publication Data

US 2022/0058814 A1  Feb. 24, 2022

(51) Int. Cl.
*G06T 7/246* (2017.01)
*G06T 7/73* (2017.01)
*G06V 20/58* (2022.01)

(52) U.S. Cl.
CPC .............. *G06T 7/248* (2017.01); *G06T 7/74* (2017.01); *G06V 20/584* (2022.01); *G06T 2207/30252* (2013.01)

(58) Field of Classification Search
CPC . G06T 7/248; G06T 7/74; G06T 2207/30252; G06V 20/584
See application file for complete search history.

(56) References Cited

U.S. PATENT DOCUMENTS

| | | | |
|---|---|---|---|
| 10,794,710 B1 * | 10/2020 | Liu | G06V 20/58 |
| 2002/0196341 A1 * | 12/2002 | Kamijo | G08G 1/164 |
| | | | 348/148 |
| 2012/0050074 A1 * | 3/2012 | Bechtel | G06V 10/147 |
| | | | 382/104 |
| 2012/0213412 A1 | 8/2012 | Murashita | |

(Continued)

FOREIGN PATENT DOCUMENTS

| | | |
|---|---|---|
| EP | 3 422 293 | 1/2019 |
| JP | 2007-278844 A | 10/2007 |

(Continued)

OTHER PUBLICATIONS

Extended European Search Report issued by the European Patent Office corresponding to European Patent Application No. 21178211.5 dated Nov. 29, 2021.

(Continued)

*Primary Examiner* — Pinalben Patel
(74) *Attorney, Agent, or Firm* — ArentFox Schiff LLP

(57) ABSTRACT

A moving body speed derivation method that causes at least one computer to execute a process, the process includes deriving a reference point in a second moving body region that is an image of a second moving body, from one image capturing the second moving body among a plurality of time-series images captured by an imaging device installed in a first moving body; deriving a position of the second moving body based on a distance between the imaging device and a feature point in the second moving body corresponding to the reference point in the second moving (Continued)

body region; and deriving speed of the second moving body based on a change amount of the position of the second moving body corresponding to the second moving body region included in the plurality of time-series images.

18 Claims, 15 Drawing Sheets

(56) References Cited

U.S. PATENT DOCUMENTS

| | | | | |
|---|---|---|---|---|
| 2014/0192145 A1* | 7/2014 | Anguelov | ............ | H04N 23/69 |
| | | | | 348/36 |
| 2017/0186169 A1* | 6/2017 | Viswanath | ............ | G06T 7/579 |
| 2018/0107883 A1* | 4/2018 | Viswanath | ............ | G06V 20/58 |

FOREIGN PATENT DOCUMENTS

| | | | | |
|---|---|---|---|---|
| JP | 2010160802 A | * | 7/2010 | ......... G06K 9/00335 |
| JP | 2012-113573 A | | 6/2012 | |

OTHER PUBLICATIONS

Arenado, M., et al., "Monovision-based vehicle detection, distance and relative speed measurement in urban traffic," IET Intelligent Transport Systems, The Institution of Engineering and Technology, Michael Faraday House, Six Hills Way, Stevenage, Herts. SG1 2AY, UK, vol. 8, No. 8, pp. 655-664, Dec. 1, 2014.

Di, Z., et al., "Forward Collision Warning System Based on Vehicle Detection and Tracking," 2016 International Conference on Opto-electronics and Image Processing, IEEE, pp. 10-14, Jun. 10, 2016.

Official Communication issued by the European Patent Office corresponding to European Patent Application No. 21178211.5 dated Oct. 19, 2023.

* cited by examiner

MOVING BODY SPEED DERIVATION METHOD AND MOVING BODY SPEED DERIVATION PROGRAM

CROSS-REFERENCE TO RELATED APPLICATION

This application is based upon and claims the benefit of priority of the prior Japanese Patent Application No. 2020-140801, filed on Aug. 24, 2020, the entire contents of which are incorporated herein by reference.

FIELD

The embodiment discussed herein is related to moving body speed derivation method and moving body speed derivation program.

BACKGROUND

There is a technique of detecting presence of an approaching vehicle in advance by performing image processing on an image captured by a camera mounted on a host vehicle. In the technique, a rate of temporal change in an azimuth angle of an end portion of a target vehicle in a horizontal direction in the case where the end portion is viewed from the host vehicle is calculated based on the captured time-series images, and whether there is a possibility that the target vehicle will come into contact with the host vehicle is determined based on a measured distance and the temporal change rate of the azimuth angle.

Examples of the related art include Japanese Laid-open Patent Publication No. 2012-113573.

SUMMARY

According to an aspect of the embodiments, a moving body speed derivation method that causes at least one computer to execute a process, the process includes deriving a reference point in a second moving body region that is an image of a second moving body, from one image capturing the second moving body among a plurality of time-series images captured by an imaging device installed in a first moving body; deriving a position of the second moving body based on a distance between the imaging device and a feature point in the second moving body corresponding to the reference point in the second moving body region; and deriving speed of the second moving body based on a change amount of the position of the second moving body corresponding to the second moving body region included in the plurality of time-series images.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A change in a traveling angle of the target vehicle with respect to a traveling direction of the host vehicle may cause the end portion of the target vehicle in the horizontal direction to move out of sight of the camera and make the camera unable to capture the end portion.

According to one aspect of the present disclosure, an object is to enable continuous derivation of speed of a second moving body by using images captured from a first moving body.

Figure 1:
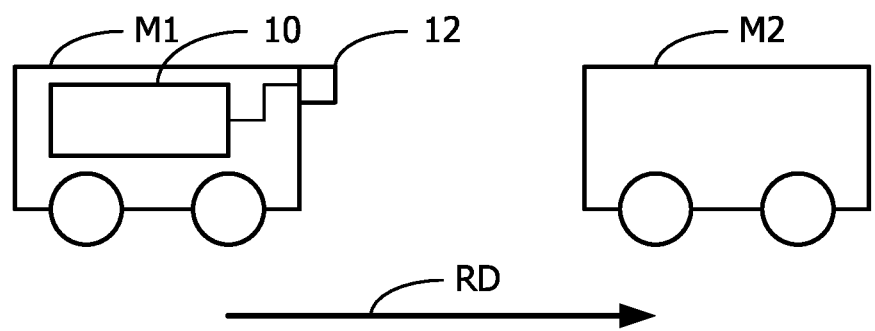
FIG. 1 is a schematic diagram illustrating a moving body including a moving body speed derivation device of an embodiment.

FIG. 1 illustrates a first moving body M1 in which a moving body speed derivation device 10 of an embodiment is mounted. In an example of FIG. 1, an imaging device 12 whose line of sight is directed toward the front of the first moving body M1 is installed in the first moving body M1. The imaging device 12 captures an image of a second moving body M2 traveling in front of the first moving body M1. The moving body speed derivation device 10 continuously derives the speed of the second moving body M2 by using the captured image.

Figure 2:
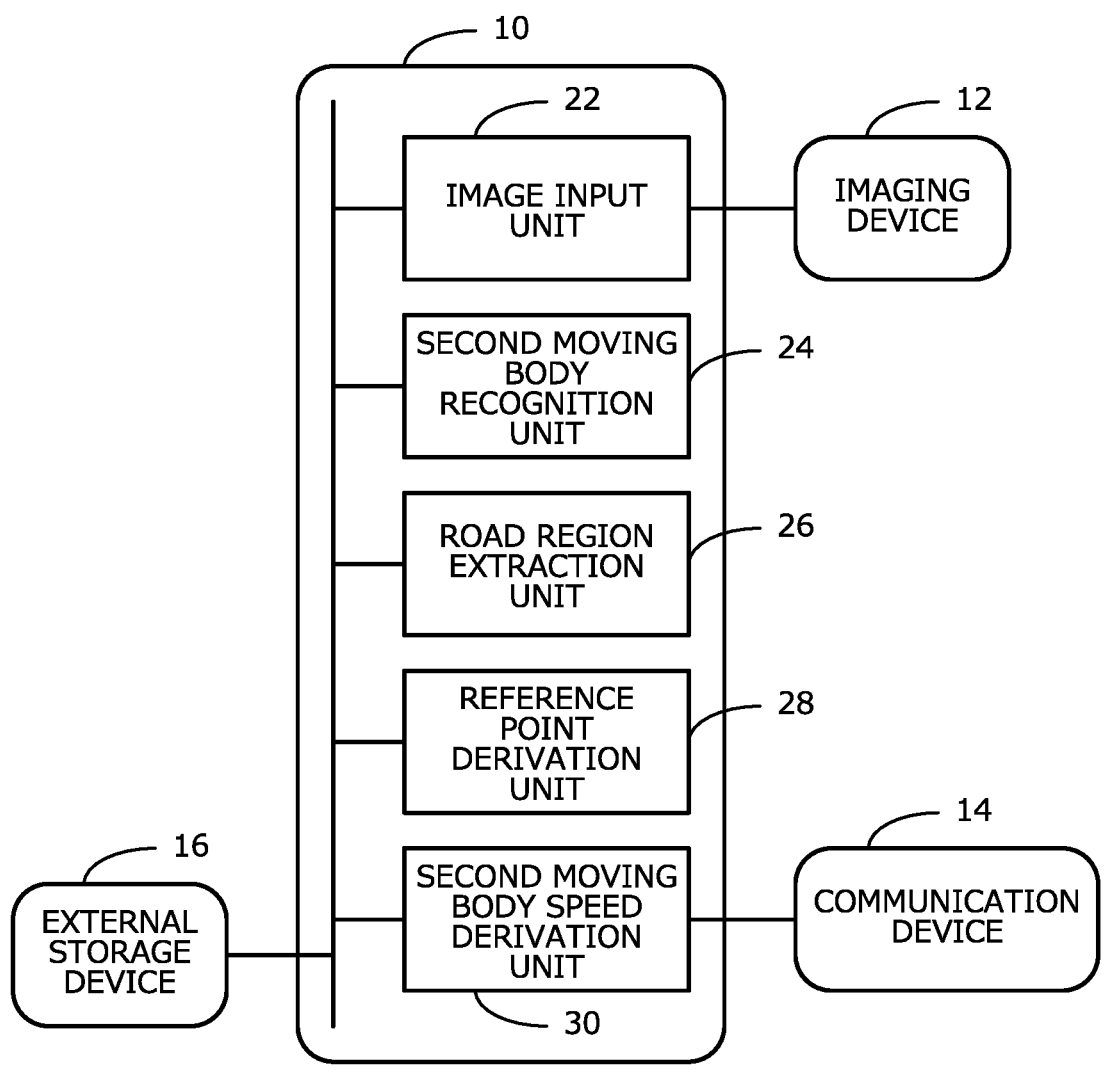
FIG. 2 is a block diagram illustrating a functional configuration of a moving body speed derivation device in the embodiment.

FIG. 2 illustrates a functional configuration of the moving body speed derivation device 10 in the present embodiment. The moving body speed derivation device 10 includes an image input unit 22, a second moving body recognition unit 24, a road region extraction unit 26, a reference point derivation unit 28, and a second moving body speed derivation unit 30. The imaging device 12, a communication device 14, and an external storage device 16 are coupled to the moving body speed derivation device 10.

The image input unit 22 receives moving image data that is an example of time-series images captured by the imaging device 12, and converts moving images to digital images if the moving images are analog images or converts the moving images to gray images if the moving images are color images. The imaging device 12 is, for example, a monocular video camera included in a drive recorder.

Figure 3:
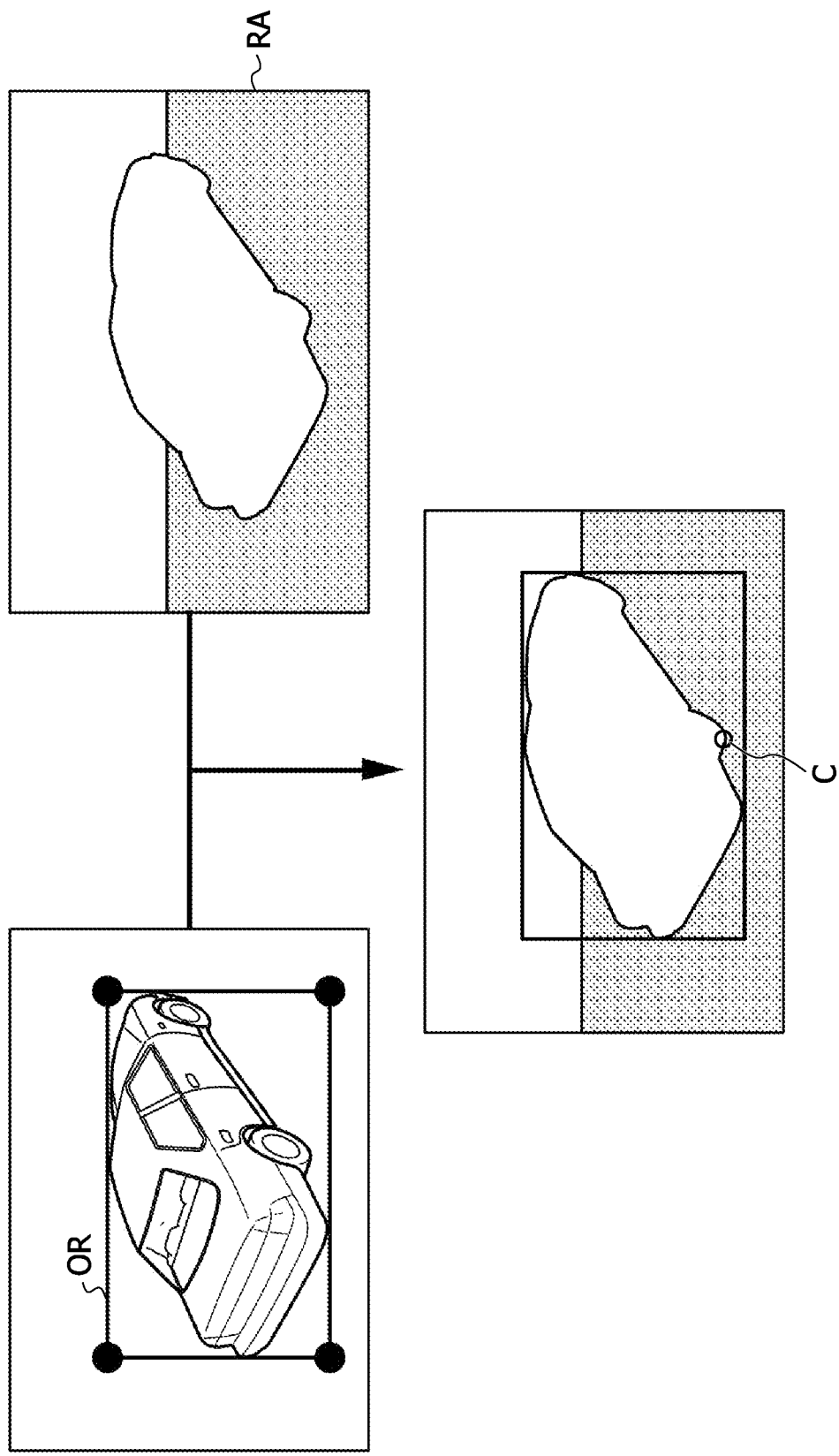
FIG. 3 is a schematic diagram describing derivation of a reference point in the embodiment.

The second moving body recognition unit 24 recognizes the second moving body M2 included in the moving image data acquired from the image input unit 22 by using a model learned to recognize a moving body to be processed. For example, the second moving body recognition unit 24 stores, in a temporary storage device, coordinates of a circumscribed rectangle OR of the recognized second moving body M2 illustrated in an upper left portion of FIG. 3, for example, coordinates of four corners of the circumscribed rectangle OR. When there are a plurality of second moving bodies M2, information such as attribute information or identification information of each of the second moving bodies M2 or any combination of these pieces of information may be stored in association with the coordinates of the circumscribed rectangle OR of the second moving body M2 to distinguish the second moving bodies M2 from each other.

The road region extraction unit 26 extracts a road region by applying semantic segmentation to the moving image data acquired from the image input unit 22 while using a model learned in advance to extract the road region. For example, the road region extraction unit 26 may assign "1" to a pixel included in a road region RA illustrated in an upper right portion of FIG. 3 and assign "0" to a pixel not included in the road region RA, and store the pixels and the assigned values in the temporary storage device as the moving image data. The road region extraction unit 26 may store, in the temporary storage device, a list in which pixel coordinates and the value assigned to each pixel are recorded in association with each other.

The reference point derivation unit 28 derives a reference point based on information on the road region RA and the coordinates of the circumscribed rectangle OR stored in the temporary storage device by the second moving body recognition unit 24. The reference point is a point in the image of the second moving body M2 that is likely to continue to be included in the field of view of the imaging device.

The second moving body speed derivation unit 30 derives the position of the second moving body M2 in an actual space based on a distance between the imaging device 12 and a feature point that is a point in the second moving body M2 corresponding to the reference point. The position of the imaging device 12 is derived from the position of the first moving body M1 in which the imaging device 12 is installed. The position of the first moving body M1 in the actual space may be, for example, an absolute position acquired by using a global navigation satellite system (GNSS), and the second moving body speed derivation unit 30 acquires information on the absolute position via the communication device 14.

The second moving body speed derivation unit 30 derives the speed of the second moving body M2 based on a change amount of the position of the second moving body in the actual space corresponding to the image of the second moving body M2 included in each of the time-series frames of the moving image data. For example, the second moving body speed derivation unit 30 stores, in the external storage device 16, a list in which the derived speed of the second moving body M2 is recorded in association with a frame number or time.

As illustrated in FIG. 1, the moving body speed derivation device 10 may be a dedicated device mounted in the first moving body M1, a general-purpose device such as a personal computer, a server installed at a location separate from the first moving body M1 and capable of communicating with the first moving body M1, or the like. A first portion of the moving body speed derivation device 10 may be mounted in the first moving body M1, and a second portion thereof may be a server.

Figure 4:
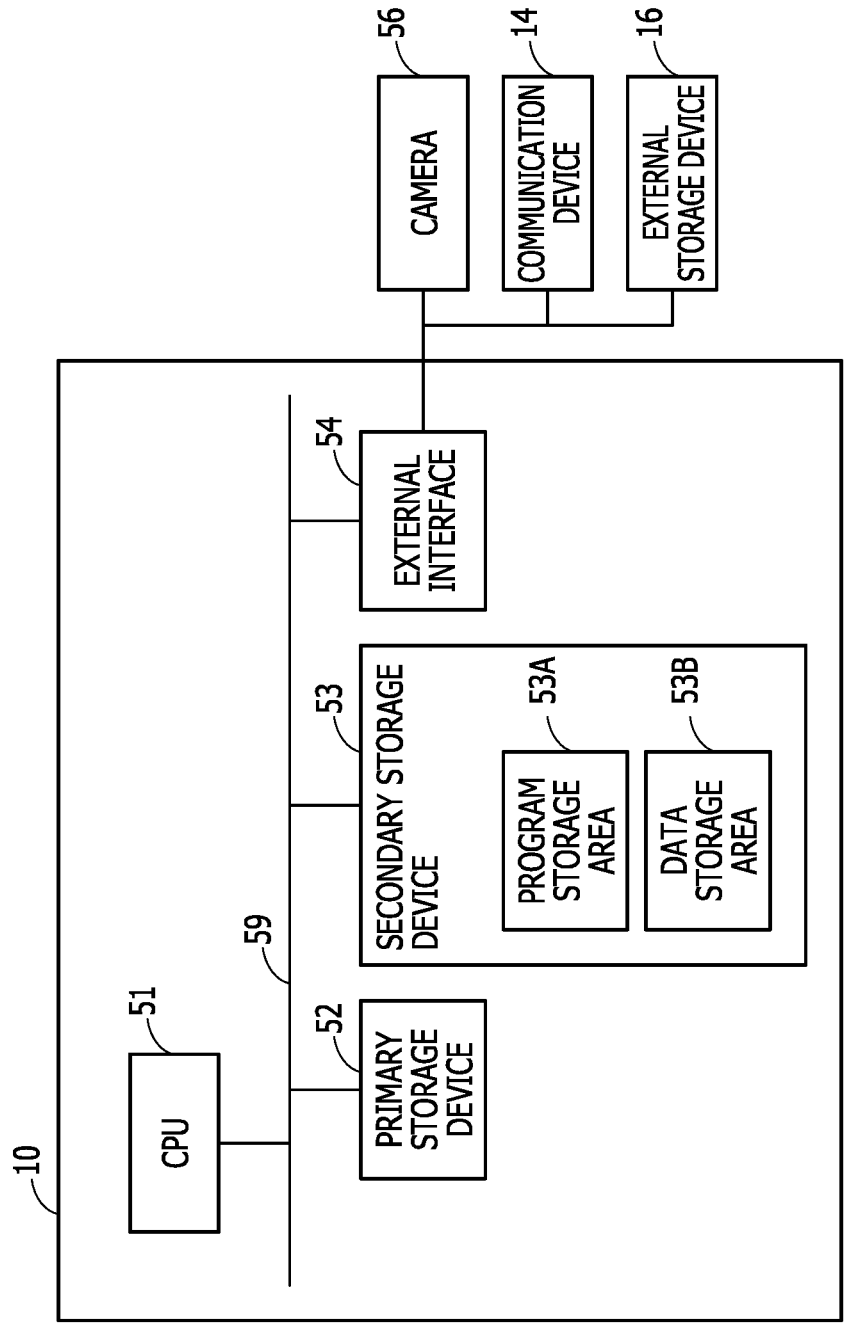
FIG. 4 is a block diagram illustrating a hardware configuration of the moving body speed derivation device in the embodiment.

FIG. 4 illustrates a hardware configuration of the moving body speed derivation device 10 of the present embodiment. As illustrated in FIG. 4, as an example, the moving body speed derivation device 10 includes a central processing unit (CPU) 51, a primary storage device 52, a secondary storage device 53, and an external interface 54.

The CPU 51 is an example of a processor that is hardware. The CPU 51, the primary storage device 52, the secondary storage device 53, and the external interface 54 are coupled to one another via a bus 59. The CPU 51 may be a single processor or may be a plurality of processors. For example, a graphics processing unit (GPU) may be used instead of the CPU 51.

The primary storage device 52 is, for example, a volatile memory such as a random-access memory (RAM). The secondary storage device 53 is, for example, a non-volatile memory such as a hard disk drive (HDD) or a solid-state drive (SSD).

The secondary storage device 53 includes a program storage area 53A and a data storage area 53B. As an example, the program storage area 53A stores programs such as a moving body speed derivation program. The data storage area 53B may function as, for example, a primary storage device that stores intermediate data generated by execution of the moving body speed derivation program.

The CPU 51 reads the moving body speed derivation program from the program storage area 53A and loads the read program into the primary storage device 52. The CPU 51 loads and executes the moving body speed derivation program and to operate as the image input unit 22, the second moving body recognition unit 24, the road region extraction unit 26, the reference point derivation unit 28, and the second moving body speed derivation unit 30 in FIG. 2.

The programs such as the moving body speed derivation program may be stored in an external server and loaded into the primary storage device 52 via a network. The programs such as the moving body speed derivation program may be stored in a non-transitory recording medium such as a Digital Versatile Disc (DVD) and loaded into the primary storage device 52 via a recording medium reading device.

External devices are coupled to the external interface 54 and the external interface 54 manages exchange of various kinds of information between the external devices and the CPU 51. FIG. 4 illustrates an example in which a camera 56 that is an example of an imaging device 12, the communication device 14, and the external storage device 16 are coupled to the external interface 54. At least one of the communication device 14 or the external storage device 16 may be built in the moving body speed derivation device 10 instead of being coupled via the external interface 54.

Figure 5:
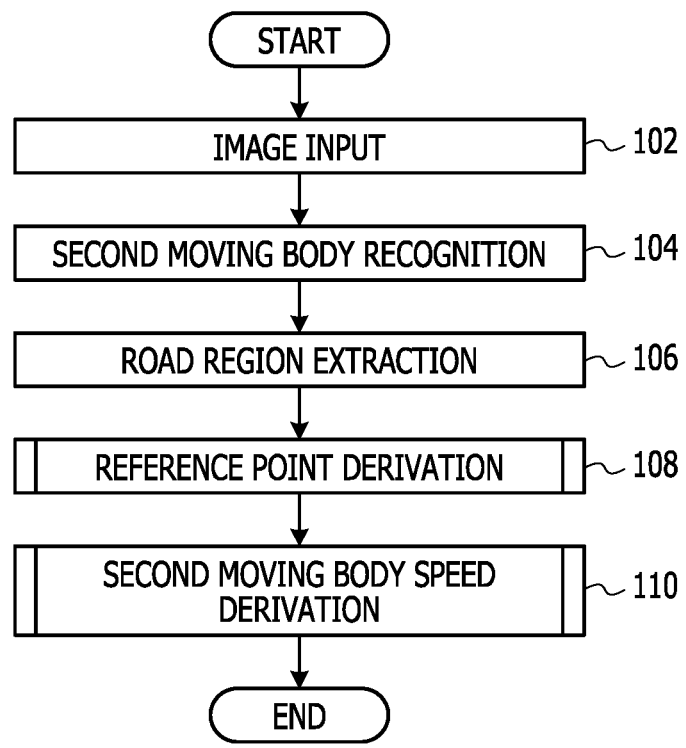
FIG. 5 is a flowchart illustrating a flow of a moving body speed derivation process in the embodiment.

FIG. 5 illustrates a flow of a moving body speed derivation process. In step 102, the CPU 51 receives a frame t of the moving image data captured by the camera 56 and, in step 104, recognizes the second moving body included in the frame t. In step 106, the CPU 51 extracts the road region from the frame t. In step 108, the CPU 51 derives the reference point from the frame t and, in step 110, derives the speed of the second moving body M2.

The moving body derivation process is repeatedly performed on frames t−n, t−n+1, . . . , t−1, t, t+1, . . . , t+m−1, and t+m. Signs t, n, and m are arbitrary integers. An imaging time difference between the adjacent frames may be, for example, ⅟30 seconds. When an image at a first time point corresponds to the frame t, an image at a second time point corresponds to the frame t−1.

Figure 6:
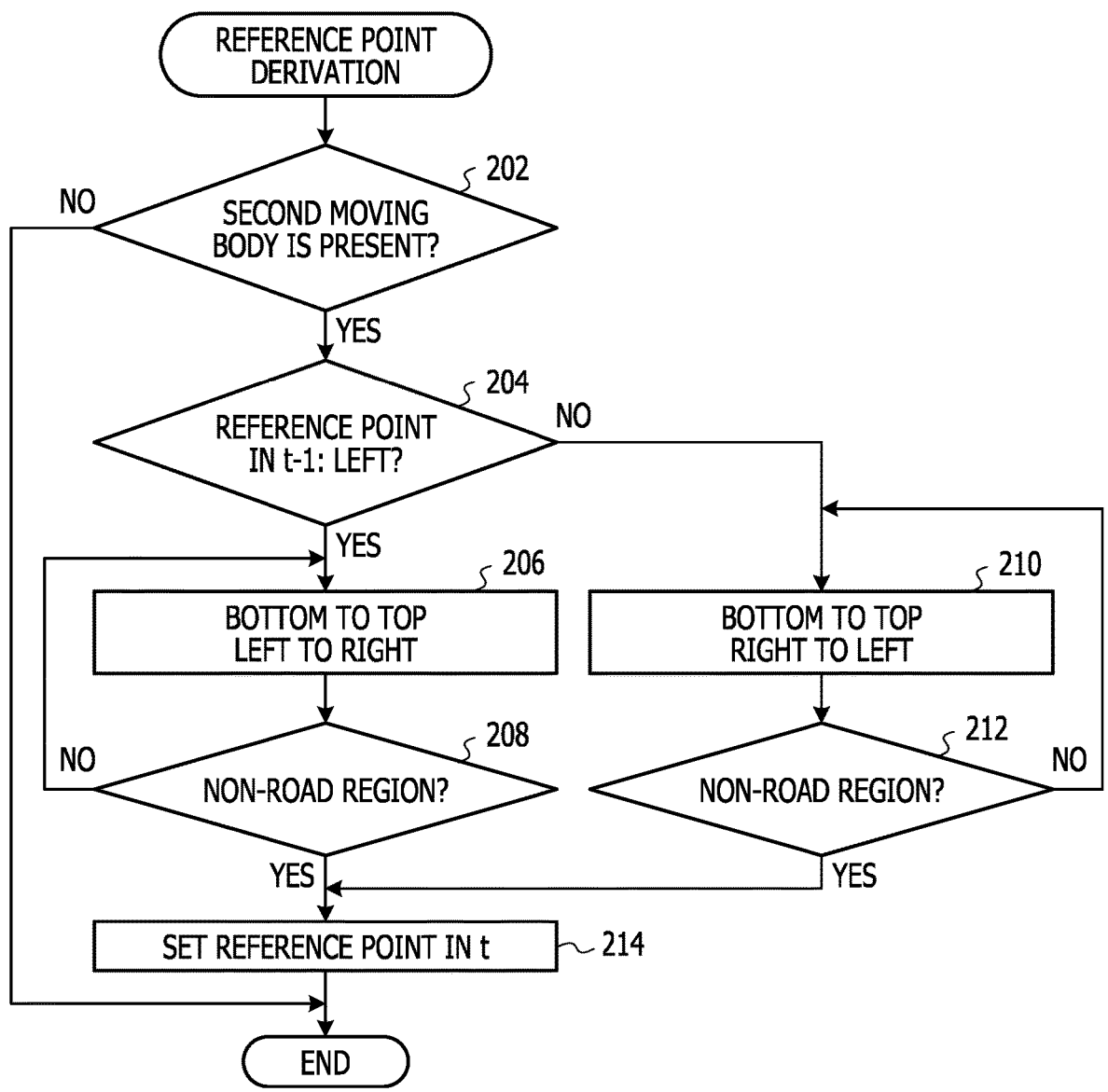
FIG. 6 is a flowchart illustrating a flow of a reference point derivation process in the embodiment.

FIG. 6 illustrates a flow of a reference point derivation process in step 108 of FIG. 5. In step 202, the CPU 51 determines whether or not the image of the second moving body is present in the frame t. When the determination in step 202 is no, the CPU 51 terminates the reference point derivation process. When the determination in step 202 is yes, for example, when the image of the second moving body is present in the frame t, in step 204, the CPU 51 determines whether or not the reference point derived in the frame t−1 is present on the left side of the center of the circumscribed rectangle of the second moving body.

When the determination in step 204 is yes, in step 206, the CPU 51 scans the circumscribed rectangle rightward from the left end toward the horizontal center, from the lower end toward the upper end. In step 208, the CPU 51 determines whether a non-road region, for example, a second moving body region is detected.

When the determination in step 208 is yes, for example, when the non-road region is detected, in step 214, the CPU 51 sets a position of the detection as a reference point of the frame t and terminates the reference point derivation process. For example, the CPU 51 stores the frame number and the coordinates of the reference point in the temporary storage device in association with each other. When the CPU 51 detects no non-road region in step 208, the process returns to step 206 to continue the scanning. The set reference point C is illustrated in a lower portion of FIG. 3.

When the determination in step 204 is no, for example, when the reference point derived in the frame t−1 is present on the right side of the horizontal center of the circumscribed rectangle, in step 210, the CPU 51 scans the circumscribed rectangle leftward from the right end toward the horizontal center, from the lower end toward the upper end. In step 212, the CPU 51 determines whether the non-road region is detected.

When the determination in step 212 is yes, for example, when the non-road region is detected, in step 214, the CPU 51 sets a position of the detection as the reference point of the frame t and terminates the reference point derivation process. For example, the CPU 51 stores the frame number and the coordinates of the reference point in the temporary storage device in association with each other. When the CPU 51 detects no non-road region in step 212, the process returns to step 210 to continue the scanning.

Figure 7:
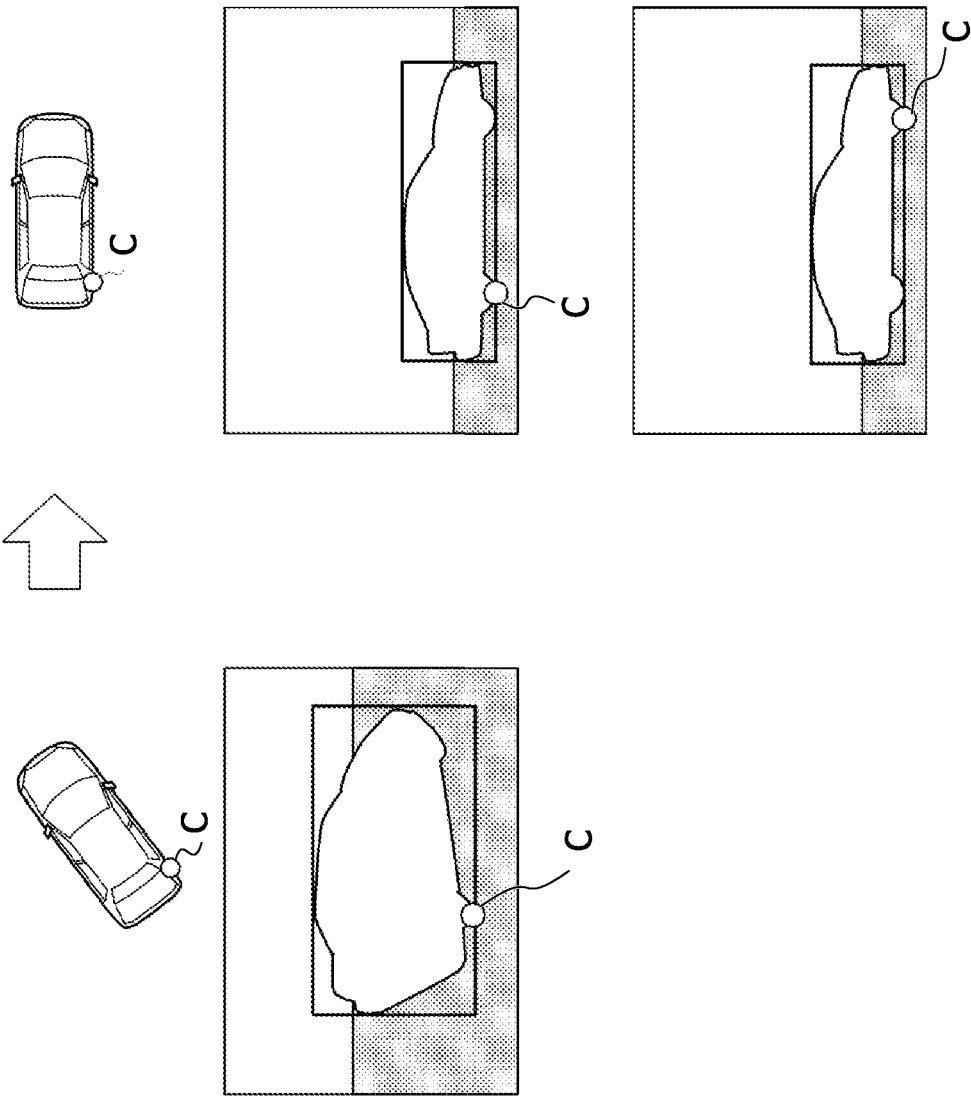
FIG. 7 is a schematic diagram describing derivation of a reference point in the embodiment.

In an example illustrated in a lower left portion of FIG. 7, the reference point C derived in the frame t−1 is located in a rear wheel of a second vehicle that is an example of the second moving body, and is present on the left side of the horizontal center of the circumscribed rectangle. In this case, when the circumscribed rectangle is scanned rightward from the left end from the lower end toward the upper end in the reference point derivation process for the frame t, as illustrated in a right center portion of FIG. 7, the reference point C is set in the rear wheel of the second vehicle. Meanwhile, when the circumscribed rectangle is scanned leftward from the right end from the lower end toward the upper end in the reference point derivation process for the frame t, as illustrated in a lower right portion of FIG. 7, the reference point C is set in a front wheel of the second vehicle. For example, a reference point that contradicts the reference point C derived in the frame t−1 is set.

In the present embodiment, the scanning direction is adjusted based on the position of the reference point C derived in the frame t−1 in the circumscribed rectangle such that the reference point C derived in the frame t−1 and the reference point C to be derived in the frame t do not contradict each other. In step 208 or 212, the first-found non-road region is set as the reference point C. The reference point C is a point in the second moving body region which is present on a boundary between the second moving body region and the road region and at which the second moving body is in contact with a road surface of a road.

For example, the CPU 51 stores the frame number and the coordinates of the reference point in the temporary storage device in association with each other to use them in the reference point derivation process for the frame t+1. The CPU 51 may store, instead of the coordinates of the reference point, "L" in the temporary storage device if the reference point is present on the left side of the horizontal center of the circumscribed rectangle or "R" in the temporary storage device if the reference point is present on the right side of the horizontal center of the circumscribed rectangle.

When no reference point is derived in the frame t−1, the circumscribed rectangle may be scanned rightward from the left end or scanned leftward from the right end. When no non-road region is detected in steps 206 and 208, subsequent to step 208, the circumscribed rectangle may be scanned rightward from the center toward the right end, from the lower end toward the upper end. When no non-road region is detected in step 210, subsequent to step 210, the circumscribed rectangle may be scanned leftward from the center toward the left end, from the lower end to the upper end.

Figure 8:
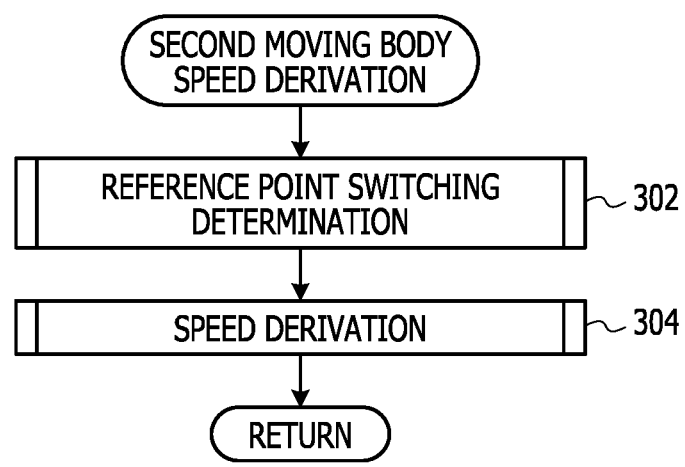
FIG. 8 is a flowchart illustrating a flow of a second moving body speed derivation process in the embodiment.
Figure 9:
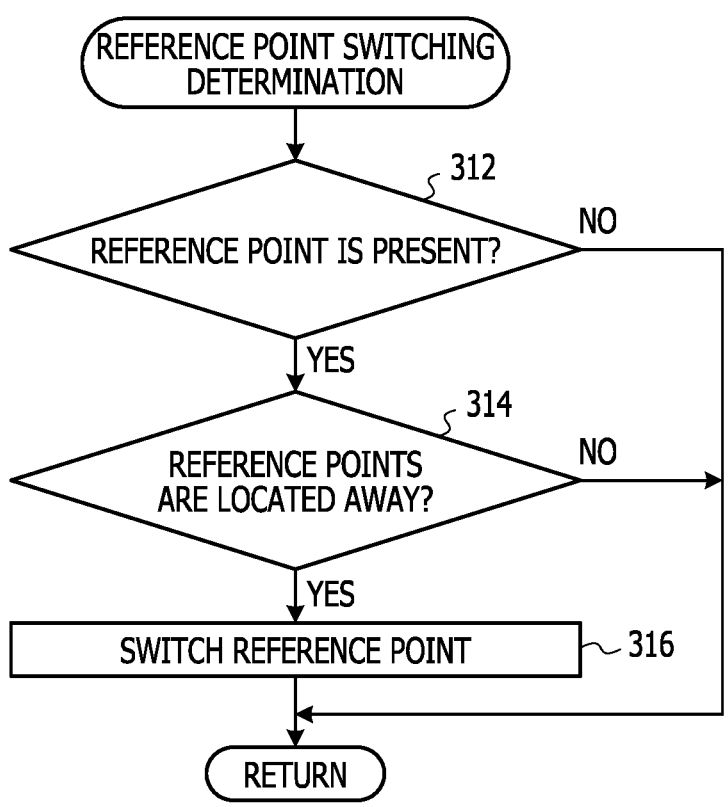
FIG. 9 is a flowchart illustrating a flow of a reference point switching determination process in the embodiment.

FIG. 8 illustrates a flow of a second moving body speed derivation process. In step 302, the CPU 51 performs a reference point switching determination process and, in step 304, performs a speed derivation process. FIG. 9 illustrates a flow of the reference point switching determination process in step 302.

In step 312, the CPU 51 determines whether or not there is the reference point derived in the second moving body speed derivation process for the frame t−1. When the determination in step 312 is yes, in step 314, the CPU 51 determines whether or not the reference point C in the frame t−1 and the reference point C in the frame t are located away from each other.

Figure 10:
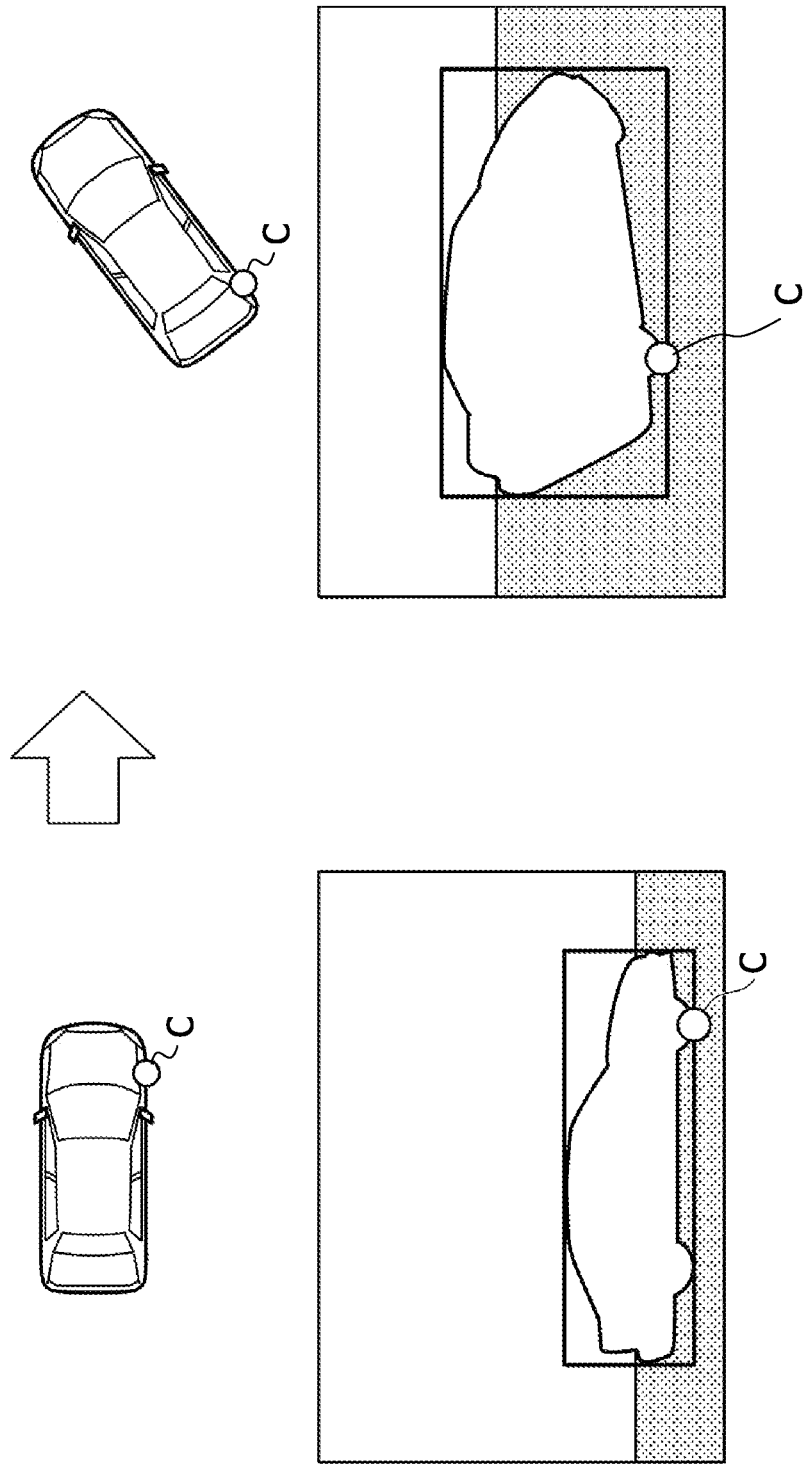
FIG. 10 is a schematic diagram describing reference point switching in the embodiment.
Figure 11:
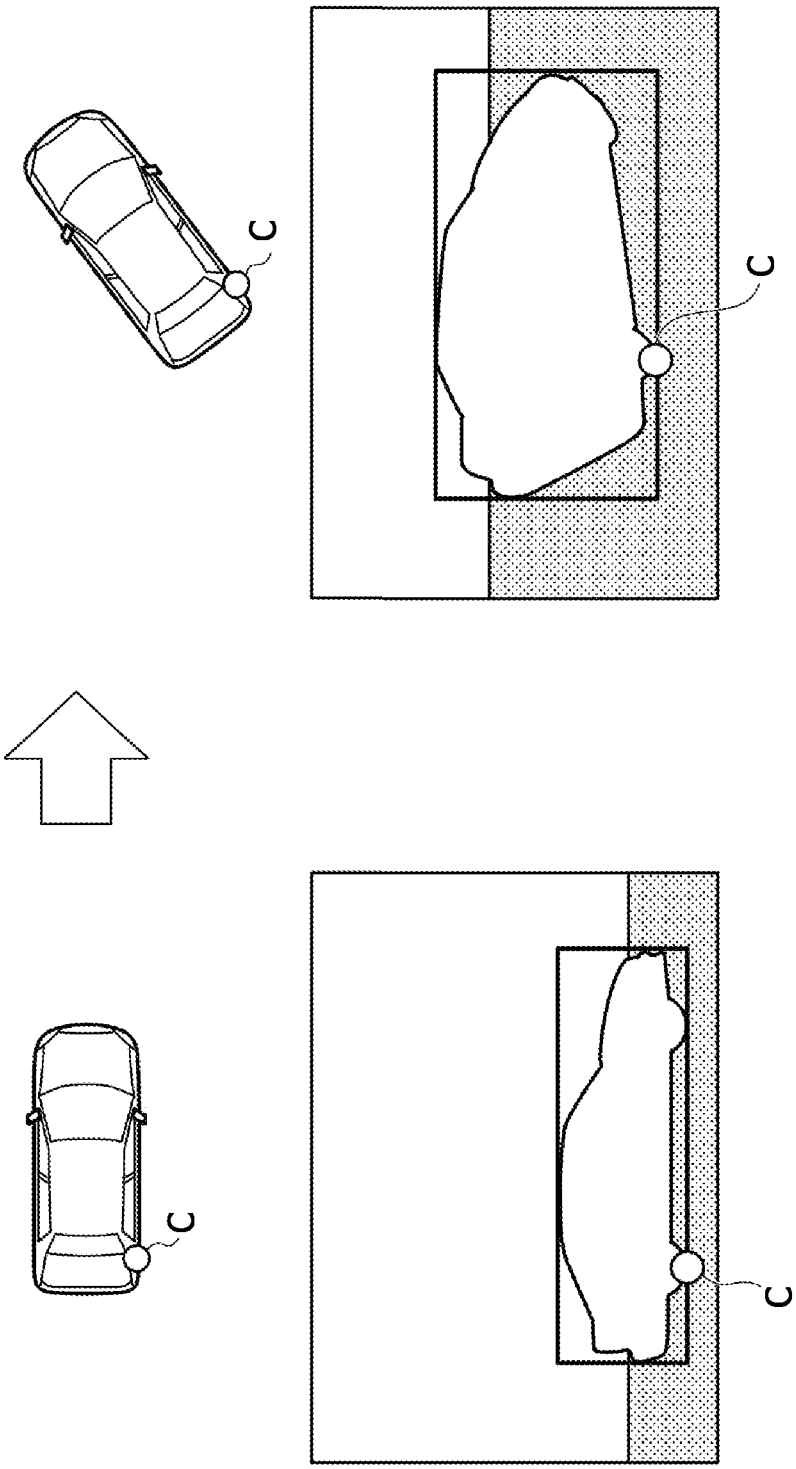
FIG. 11 is a schematic diagram describing the reference point switching in the embodiment.

When the determination in step 314 is yes, in step 316, the CPU 51 changes the position of the reference point in the frame t−1. For example, when the reference point in the frame t−1 is located in the front wheel as illustrated in a lower left portion of FIG. 10 and the reference point in the frame t is located in the rear wheel as illustrated in a lower right portion of FIG. 10, the CPU 51 determines that the reference points are located away from each other. In this case, as illustrated in a lower left portion of FIG. 11, the reference point of the frame t−1 is changed to be located in the rear wheel.

For example, when the non-road region is detected in steps 206 and 208 of FIG. 6, the point in the non-road region detected in steps 210 and 212 may be stored as a backup reference point in the temporary storage device and be replaced with the reference point. For example, when the non-road region is detected in step 210 and step 212 of FIG. 6, the point in the non-road region detected in steps 206 and 208 may be stored as the backup reference point in the temporary storage device and be replaced with the reference point.

In step 206, instead of scanning the circumscribed rectangle from the left end toward the horizontal center, the circumscribed rectangle may be scanned from the left end toward a position away from the left end by ⅓ the horizontal width of the circumscribed rectangle or toward a position away from the left end by ⅔ the horizontal width. In step 210, instead of scanning the circumscribed rectangle from the right end toward the horizontal center, the circumscribed rectangle may be scanned from the right end toward a position away from the right end by ⅓ the horizontal width of the circumscribed rectangle or toward a position away from the right end by ⅔ the horizontal width.

For example, when a distance between the reference point in the frame t−1 and the reference point in the frame t is equal to or greater than a predetermined distance based on the horizontal length of the circumscribed rectangle, the CPU 51 may determine that the reference points are located away from each other. The predetermined distance may be, for example, 40% the horizontal length of the circumscribed rectangle.

Figure 12:
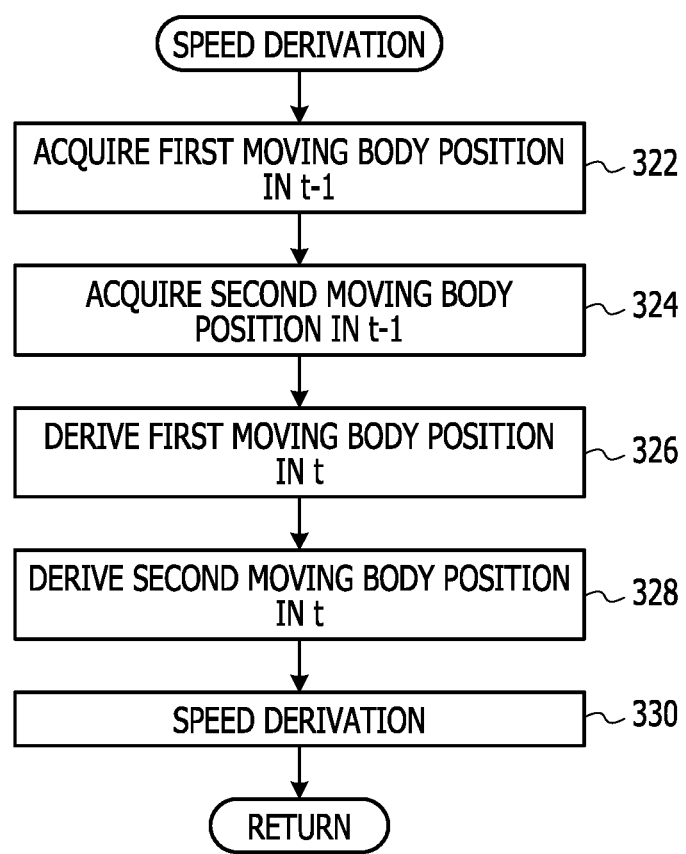
FIG. 12 is a flowchart illustrating a flow of a speed derivation process in the embodiment.

FIG. 12 illustrates a flow of the speed derivation process in step 304 of FIG. 8. In step 322, the CPU 51 acquires position information of a first vehicle that is an example of the first moving body in the frame t−1. The position information of the first moving body in the frame t−1 may be stored, for example, in the temporary storage device.

In step 324, the CPU 51 acquires position information of the second moving body in the frame t−1. The position information of the second moving body in the frame t−1 may be stored, for example, in the temporary storage device. In step 326, the CPU 51 acquires position information of the first moving body in the frame t. The position information of the first moving body may be, for example, the absolute position acquired by using the GNSS or a relative position acquired by using vehicle information such as vehicle speed or a steering angle. The position information of the first moving body in the frame t is stored, for example, in the temporary storage device to be used in a process for the frame t+1 as the position information of the first moving body in the immediately preceding frame.

Figure 13:
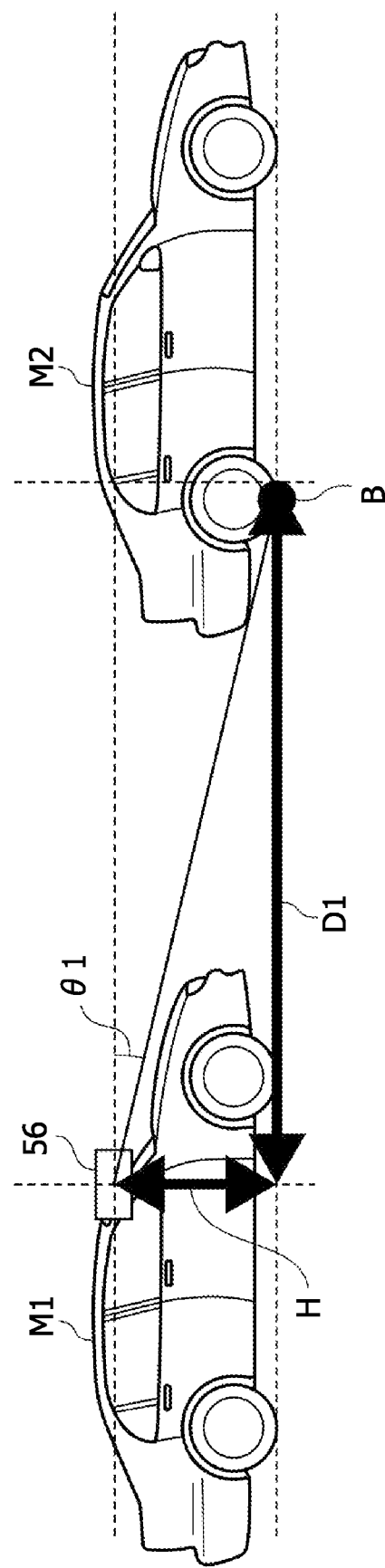
FIG. 13 is a schematic diagram describing speed derivation in the embodiment.
Figure 14:
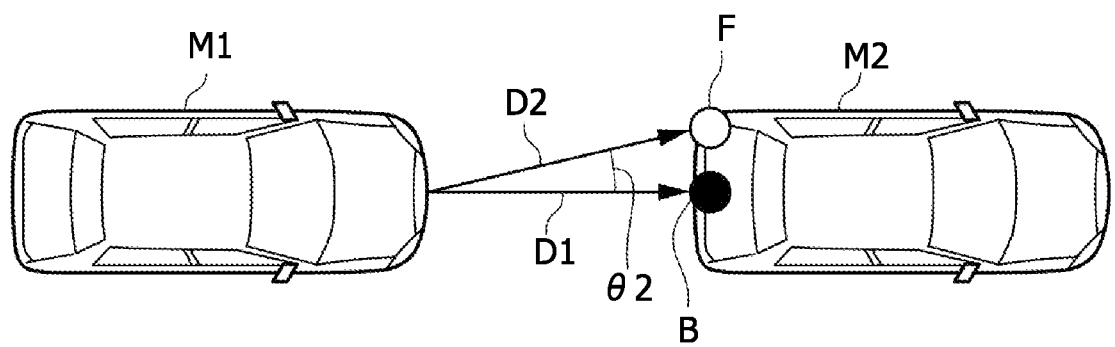
FIG. 14 is a schematic diagram describing speed derivation in the embodiment.

In step 328, the CPU 51 derives position information of the second moving body in the frame t. As illustrated in FIGS. 13 and 14, the position information of the second moving body M2 is derived, for example, by using Expressions (1) and (2) based on a distance D2 from the position of the camera 56 to the position of the second moving body M2, an elevation angle θ1 and an azimuth angle θ2 from the camera 56 to the second moving body M2, and the position of the first moving body M1. The position of the camera 56 is derived, for example, from the position of the first moving body M1 in which the camera 56 is installed and the position of the camera 56 in the first moving body M1.

$$D1 = H/\tan \theta 1 \quad (1)$$

$$D2 = D1/\cos \theta 2 \quad (2)$$

In order to simplify the description, description is given assuming that the camera 56 is installed such that the line of sight of the camera 56 is parallel to the traveling direction of the first moving body M1. However, an orientation in which the camera 56 is installed in the first moving body M1 may be adjusted as appropriate.

D1 is a distance between the camera 56 and an intersection B between a line of sight VL of the camera 56 and a straight line FL that is perpendicular to the line of sight VL and that passes through a feature point F when viewed from above. As illustrated in FIGS. 13 and 14, when both the first moving body M1 and the second moving body M2 travel straight with the centers thereof in the width direction aligned and the camera 56 is installed at the center of the first moving body M1 in the width direction, the intersection B between the straight line FL and the line of sight VL is located at the center of the second moving body M2 in the width direction. The feature point F is a point in the second moving body M2 corresponding to the reference point C.

H is a height at which the camera 56 is installed, and the elevation angle θ1 is an angle between the line of sight VL of the camera 56 and a straight line extending from the camera 56 to the intersection B when viewed from the side. The elevation angle θ1 may be derived by a conversion method between an existing camera coordinate system and an actual space coordinate system based on coordinates of a position corresponding to the intersection B in the frame t, the orientation and characteristics of the camera 56, and the like.

As illustrated in FIG. 14, the azimuth angle θ2 is an angle between a straight line coupling the camera 56 and the intersection point B and a straight line coupling the camera 56 and the feature point F when viewed from above. Like θ1, θ2 may also be derived by the conversion method between the existing camera image system and the actual space coordinate system. The position of the second moving body M2 is acquired by deriving a position located at a distance D2 from the position of the camera 56 at an angle of the azimuth angle θ2 when viewed from above.

In step 330, as illustrated in Equation (3), the CPU 51 derives the speed of the second moving body based on position coordinates (x1, y1) of the second moving body M2 in the frame t−1, position coordinates (x2, y2) of the second moving body M2 in the frame t, and a time difference T between the frame t−1 and the frame t.

$$V = \frac{\sqrt{(x2 - x1)^2 + (y2 - y1)^2}}{T} \quad (3)$$

Figure 15:
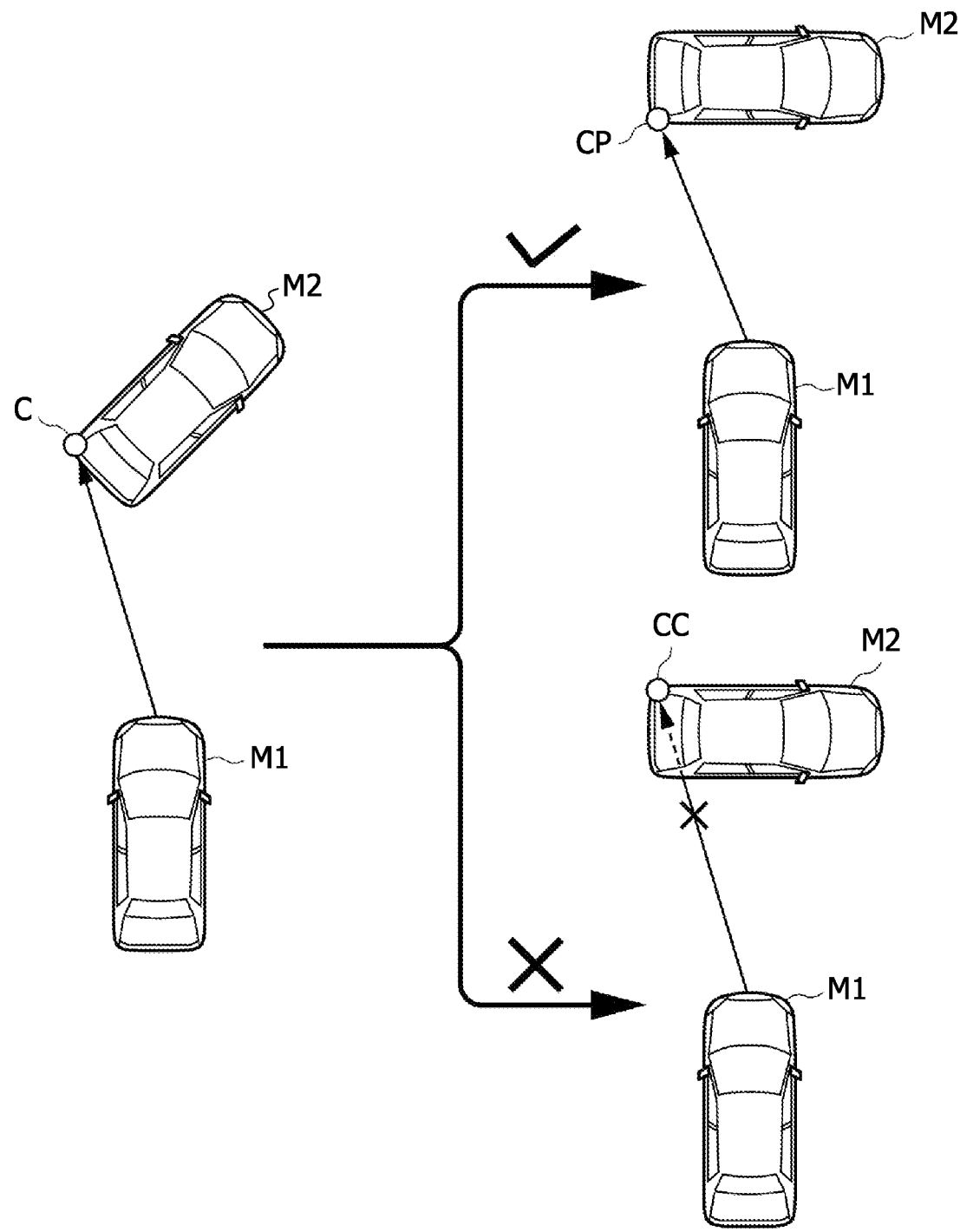
FIG. 15 is a schematic diagram for comparing the embodiment with the related art.

In the related art, as illustrated in a left portion of FIG. 15, the position of the reference point C is determined to be a rear horizontal end point of the second moving body M2. In the related art, as illustrated in a lower right portion of FIG. 15, when the traveling direction of the second moving body M2 relative to the traveling direction of the first moving body M1 greatly changes, a reference point CC corresponding to the reference point C moves out of sight of the camera. Thus, the distance between the first moving body M1 and the second moving body M2 may sometimes not be appropriately derived.

In contrast, in the present embodiment, even if the position of the reference point C is determined as illustrated in the left portion of FIG. 15, a reference point CP that is highly likely to continue to be included in the field of view of the camera is newly set when the traveling direction of the second moving body M2 with respect to the traveling direction of the first moving body M1 greatly changes. The reference point CP is illustrated in an upper right portion of FIG. 15. Accordingly, even if the traveling direction of the second moving body M2 with respect to the traveling direction of the first moving body M1 greatly changes, it is possible to continuously derive the distance between the first moving body M1 and the second moving body M2 and continuously derive the speed of the second moving body M2.

The moving body is not limited to a vehicle and may be, for example, a type of drone that travels on a road surface. The road may be, for example, a roadway, a sidewalk, or the like. The camera is not limited to the example in which the camera is installed in a front portion of the first moving body, and may be installed in, for example, a side portion or a rear portion or any combination thereof in addition to or instead of the front portion.

The flows of the processes in the flowcharts of FIGS. 5, 6, 8, 9, and 12 are examples and the order of steps may be appropriately changed or replaced with other steps.

In the present embodiment, the reference point in the second moving body region that is the image of the second moving body is derived from one image capturing the second moving body among the plurality of time-series images captured by the imaging device installed in the first moving body. The position of the second moving body is derived based on the distance between the imaging device and the feature point in the second moving body corresponding to the reference point in the second moving body region, and the speed of the second moving body is derived based on a change amount of the position of the second moving body corresponding to the second moving body region included in the plurality of time-series images.

According to the present embodiment, it is possible to continuously derive the speed of the second moving body by using the image captured from the first moving body. For example, it is possible to analyze a traffic accident situation by using the present embodiment to estimate the speed of a vehicle of the other party of an accident that is difficult to manually analyze from a monocular image captured by a drive recorder or the like.

The following appendices are further disclosed in relation to each of the above embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A moving body speed derivation method that causes at least one computer to execute a process, the process comprising:
    acquiring moving image data including a plurality of time-series images captured from an imaging device installed in a first moving body;
    recognizing a second moving body region included in the moving image data using a model to recognize a second moving body;
    extracting a road region by applying semantic segmentation to the moving image data using a model to extract the road region;
    deriving a reference point in the second moving body region in each image of the plurality of time-series images based on the road region and the second moving body region;
    deriving a position of the second moving body in an actual space based on a distance between the imaging device and a feature point in the second moving body corresponding to the reference point and an absolute position of the first moving body acquired by using a global navigation satellite system; and
    deriving a speed of the second moving body based on a change amount of the position of the second moving body in the actual space corresponding to the second moving body region included in the plurality of time-series images.

2. The moving body speed derivation method according to claim 1, wherein the reference point is a point which is present on a boundary between the second moving body region and a road region and at which the second moving body is in contact with a road surface of a road corresponding to the road region.

3. The moving body speed derivation method according to claim 2, wherein when a distance between a first reference point that is the reference point derived from an image being one of the plurality of time-series images and captured at a first time point and a second reference point that is the reference point derived from an image captured at a second time point being a time point before the first time point is equal to or greater than a predetermined distance, the second reference point is changed to a point different from the second reference point among points which are present on the boundary between the second moving body region and the road region in the image at the second time point and at which the second moving body is in contact with the road surface.

4. The moving body speed derivation method according to claim 1, wherein the distance between the feature point and the imaging device is derived based on a position of the reference point in one of the plurality of time-series images.

5. The moving body speed derivation method according to claim 1, wherein the position of the second moving body is determined based on a position of the imaging device, a distance between the feature point and the imaging device when viewed from above, and an angle between a line of sight of the imaging device and a straight line coupling the imaging device and the feature point when viewed from above.

6. The moving body speed derivation method according to claim 1, wherein the first moving body and the second moving body are vehicles traveling on a road surface.

7. A non-transitory computer-readable medium storing a moving body speed derivation program that causes at least one computer to execute a process, the process comprising:
    acquiring moving image data including a plurality of time-series images captured from an imaging device installed in a first moving body;
    recognizing a second moving body region included in the moving image data using a model to recognize a second moving body;
    extracting a road region by applying semantic segmentation to the moving image data using a model to extract the road region;
    deriving a reference point in the second moving body region in each image of the plurality of time-series images based on the road region and the second moving body region;
    deriving a position of the second moving body in an actual space based on a distance between the imaging device and a feature point in the second moving body corresponding to the reference point and an absolute position of the first moving body acquired by using a global navigation satellite system; and
    deriving a speed of the second moving body based on a change amount of the position of the second moving body in the actual space corresponding to the second moving body region included in the plurality of time-series images.

8. The non-transitory computer-readable medium according to claim 7, wherein the reference point is a point which is present on a boundary between the second moving body region and a road region and at which the second moving body is in contact with a road surface of a road corresponding to the road region.

9. The non-transitory computer-readable medium according to claim 8, wherein when a distance between a first reference point that is the reference point derived from an image being one of the plurality of time-series images and captured at a first time point and a second reference point that is the reference point derived from an image captured at a second time point being a time point before the first time point is equal to or greater than a predetermined distance, the second reference point is changed to a point different from the second reference point among points which are present on the boundary between the second moving body region and the road region in the image at the second time point and at which the second moving body is in contact with the road surface.

10. The non-transitory computer-readable medium according to claim 7, wherein the distance between the feature point and the imaging device is derived based on a position of the reference point in one of the plurality of time-series images.

11. The non-transitory computer-readable medium according to claim 7, wherein the position of the second moving body is determined based on a position of the imaging device, a distance between the feature point and the imaging device when viewed from above, and an angle between a line of sight of the imaging device and a straight line coupling the imaging device and the feature point when viewed from above.

12. The non-transitory computer-readable medium according to claim 7, wherein the first moving body and the second moving body are vehicles traveling on a road surface.

13. A moving body speed derivation apparatus comprising:
   an imaging device installed in a first moving body;
   one or more memories; and
   one or more processors coupled to the one or more memories and the one or more processors configured to:
   acquire moving image data including a plurality of time-series images captured from an imaging device installed in a first moving body,
   recognize a second moving body region included in the moving image data using a model to recognize a second moving body,
   extract a road region by applying semantic segmentation to the moving image data using a model to extract the road region,
   derive a reference point in the second moving body region in each image of the plurality of time-series images based on the road region and the second moving body region,
   derive a position of the second moving body in an actual space based on a distance between the imaging device and a feature point in the second moving body corresponding to the reference point and an absolute position of the first moving body acquired by using a global navigation satellite system, and
   derive a speed of the second moving body based on a change amount of the position of the second moving body in the actual space corresponding to the second moving body region included in the plurality of time-series images.

14. The moving body speed derivation apparatus according to claim 13, wherein the reference point is a point which is present on a boundary between the second moving body region and a road region and at which the second moving body is in contact with a road surface of a road corresponding to the road region.

15. The moving body speed derivation apparatus according to claim 14, wherein when a distance between a first reference point that is the reference point derived from an image being one of the plurality of time-series images and captured at a first time point and a second reference point that is the reference point derived from an image captured at a second time point being a time point before the first time point is equal to or greater than a predetermined distance, the second reference point is changed to a point different from the second reference point among points which are present on the boundary between the second moving body region and the road region in the image at the second time point and at which the second moving body is in contact with the road surface.

16. The moving body speed derivation apparatus according to claim 13, wherein the distance between the feature point and the imaging device is derived based on a position of the reference point in one of the plurality of time-series images.

17. The moving body speed derivation apparatus according to claim 13, wherein the position of the second moving body is determined based on a position of the imaging device, a distance between the feature point and the imaging device when viewed from above, and an angle between a line of sight of the imaging device and a straight line coupling the imaging device and the feature point when viewed from above.

18. The moving body speed derivation apparatus according to claim 13, wherein the first moving body and the second moving body are vehicles traveling on a road surface.

* * * * *